United States Patent [19]
Vermolen

[11] 3,777,248
[45] Dec. 4, 1973

[54] DIRECT-CURRENT CONVERTER
[75] Inventor: Johannes Volkert Vermolen, Beekbergen, Netherlands
[73] Assignee: U.S. Philips Corporation, New York, N.Y.
[22] Filed: Jan. 26, 1972
[21] Appl. No.: 220,929

[30] Foreign Application Priority Data
Feb. 9, 1971  Netherlands.................. 7101662

[52] U.S. Cl.................. 321/2, 321/10, 321/25, 321/45 S, 331/113 A
[51] Int. Cl. ........................................ H02m 3/32
[58] Field of Search ............... 321/2, 10, 25, 45 S; 331/113 A

[56] References Cited
UNITED STATES PATENTS
3,314,023  4/1967  Gibb ........................ 331/113 A
3,317,856  5/1967  Wilkinson .................. 331/113 A
2,710,938  6/1955  Lee ............................ 321/10 X
3,308,265  3/1967  Hobart ...................... 321/10 X OTHER PUBLICATIONS
"New Methods of Regulation for Stabilized Power Supplies," A. N. Heightman, pp. 110–130.

Primary Examiner—William M. Shoop, Jr.
Attorney—Frank R. Trifari

[57] ABSTRACT

A direct-current converter comprises an oscillator circuit and a smoothing capacitor. The oscillator circuit and the smoothing capacitor are isolated from each other by one or more windings of a saturable choke. The wattless loss which would occur in each half period is eliminated in that an additional winding on the choke core saturates the choke after disappearance of the switch-on phenomenon. The additional winding carries the output current.

9 Claims, 2 Drawing Figures

DIRECT-CURRENT CONVERTER

The invention relates to a direct-current converter, comprising two direct-current input terminals, an oscillator circuit, a transformer circuit connected thereto, a rectifier circuit, a smoothing capacitor, and two direct-current output terminals. Direct-current converters of this kind operate as a transformer for direct-current. The smoothing capacitor forms a short-circuit when the converter is switched on. The triggering of the oscillator circuit is thus hampered. In order to form an inductive load for the oscillator circuit when the converter is switched on, said inductive load, however, being constructed as a saturable choke so that it is saturated by the charging current of the smoothing capacitor, and in order to reduce losses after the disappearance of the switch-on phenomenon by rendering the inductive load inactive, the invention is characterized in that at least one first winding of a saturable choke, provided in the direct-current converter and having at least two windings, is connected in a conductor between an output of the transformer circuit and a pole of the smoothing capacitor, at least one additional winding being connected between a pole of the smoothing capacitor and a direct-current output terminal.

When the converter is switched on, the smoothing capacitor has a small charge and the charging current would, consequently, be large, were it not that between the oscillator circuit and the smoothing capacitor the said first winding forms a high inductive impedance so that the oscillator circuit is normally brought into oscillation. As the current supplied to the smoothing capacitor increases during one half period, the current through this first winding saturates the choke at a given instant. As a result, the inductive load between the oscillator circuit and the smoothing capacitor is removed. However, this is effected only some time after the beginning of the relevant half period, and then it no longer obstructs the oscillator circuit in completing this half oscillation. Due to the removal of the inductive load, only an insignificant voltage loss occurs and hence little (reactive) power is lost.

At the end of the half period the current decreases and the choke is no longer saturated, so that the next half period will be the same. Together with the voltage on the smoothing capacitor, the output current to be supplied by the converter increases to a value such that it saturates the choke by means of the additional winding. However, the capacitor voltage is then also high and the capacitor no longer forms a short circuit.

The invention has for an object, on the one hand, to provide a temporary inductive load for triggering the oscillation and, on the other hand, to render this temporary inductive load inactive again by means of the load current. In this way the loss of wattless power is avoided. Moreover, the loss of magnetizing energy which would otherwise be necessary in each half period for saturating the choke is also avoided.

A preferred embodiment according to the invention is characterized in that the number of turns of said additional winding is larger than the number of turns of each of the said at least one first winding. When the load is connected, the direction of the magnetic field strength in the choke core is thus determined, after the disappearance of the switch-on phenomenon, by the current in the additional winding as the latter has a larger number of ampere turns.

In particular, the input terminals of a direct-current converter according to the invention can be connected to a direct-current source and its output terminals can be connected to a load, the direct-current converter being characterized in that the number of ampere turns of said additional winding is so large, under the influence of the current through the load, so that after the disappearance of the switch-on phenomenon the choke is permanently saturated.

In order that the invention may be readily carried into effect, two embodiments thereof will now be described in detail, by way of example, with reference to the accompanying diagrammatic drawing in which:

FIG. 1 shows an embodiment of a direct-current converter according to the invention comprising two direct-current input terminals A1 and A2, two transistors T1 and T2, one transformer TR having windings W1, W2, W3, W4 and E, one choke having three windings S1, S2 and S3, four diodes D1, D2, D7 and D8, one smoothing capacitor C, two resistors R1 and R2, and two output terminals B1 and B2.

Figure 1:
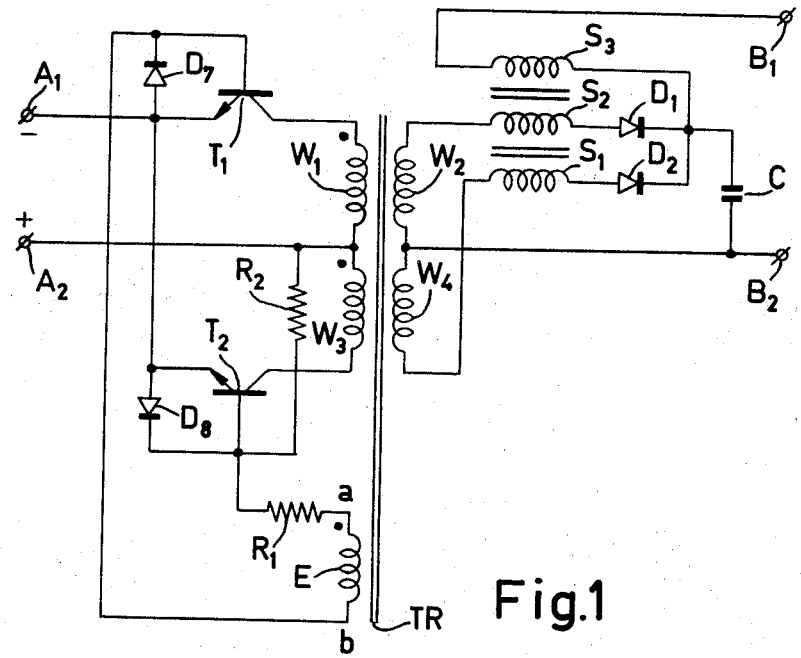
FIG. 1 is a schematic circuit diagram of a first embodiment of the invention.

The direct-current input terminals A1 and A2 are connected to the negative and the positive terminals, respectively, of a direct-current source, not shown. The oscillator circuit formed by the winding E and the transistors T1 and T2 is designed such that one of the two transistors is always conducting while the other is cut-off. Consequently, the windings W1 and W3 alternately carry current pulses in the opposite sense. A transformed current is generated on the secondary side. With respect to the junction point of W2 and W4, the other ends of these windings alternately receive positive voltages. The currents are rectified by the diodes D1 and D2 and are smoothed by the smoothing capacitor C. Assume that the capacitor C is absent and that a resistive load is connected between the terminals B1 and B2, it being possible to transform this resistive load to the primary side of the transformer TR. Consequently, the primary side is loaded by two resistors instead of W1 and W3. When the converter is switched on, the side $a$ of the winding E becomes high via R1 and R2. As a result, transistor T2 becomes conducting. Consequently, the current in W3 increases. Due to the increase of the current through transistor T2, the voltage drop across T2 also increases until the voltage drop becomes so large that T2 is cut off so that the current through W3 decreases. As a result, the current through the winding E is given the opposite polarity so that transistor T1 becomes conducting and the next half period commences. The diodes D7 and D8 serve for closing the current path for the winding E around a cut-off transistor and the resistor R1 limits the current.

Another method of oscillation is realized if the current (in the first half period) through W3 becomes so large that the transformer TR is saturated. The voltage across the winding E then decreases and the oscillator circuit switches over. It is alternatively possible to use an auxiliary transformer instead of the winding E, the primary winding of the said auxiliary transformer being supplied via an auxiliary winding on the transformer TR, the secondary winding taking the place of E. The auxiliary transformer is then proportioned such that it becomes saturated. The advantage of the use of a saturable transformer is due to the fact that the frequency is thus rendered independent of the load. This frequency is preferably chosen to be, for example, 20,000 Hz.

When the smoothing capacitor C is provided, it is also transformed to the primary side so that the load is formed by a resistor and a capacitor connected in parallel. When the converter is switched on, the high potential of $a$ causes the transistor T2 to become conducting. The current through T2 then increases very rapidly (short circuit through C) and the polarity of the voltage across E is also reversed very rapidly. T2 is cut off again. This causes a substantially higher switch-over rate. The oscillator circuit then appears to be difficult to trigger.

The choke windings S1 and S2 now form the said first windings (in this case two) by means of which the smoothing capacitor C is isolated from the oscillator circuit when the converter is switched on. Triggering is then performed satisfactorily. Furthermore, S1 and S2 alternately carry current pulses so that they saturate the choke core after the beginning of each half period. Consequently, in each half period losses are introduced, i.e., the wattless losses, because the current each time has to increase, and also losses due to the magnetizing of the choke core. This is eliminated by the additional winding S3 on the same core. A direct current flowing through this winding can keep the choke continuously saturated so that wattless losses no longer occur. When the power is first switched on, the voltage on the smoothing capacitor is then very low so that S3 cannot yet saturate the choke. If the terminals B1 and B2 are not connected to a load, saturation is not possible either. In that case, however, the circuit draws no current and the wattless losses are very small.

Figure 2:
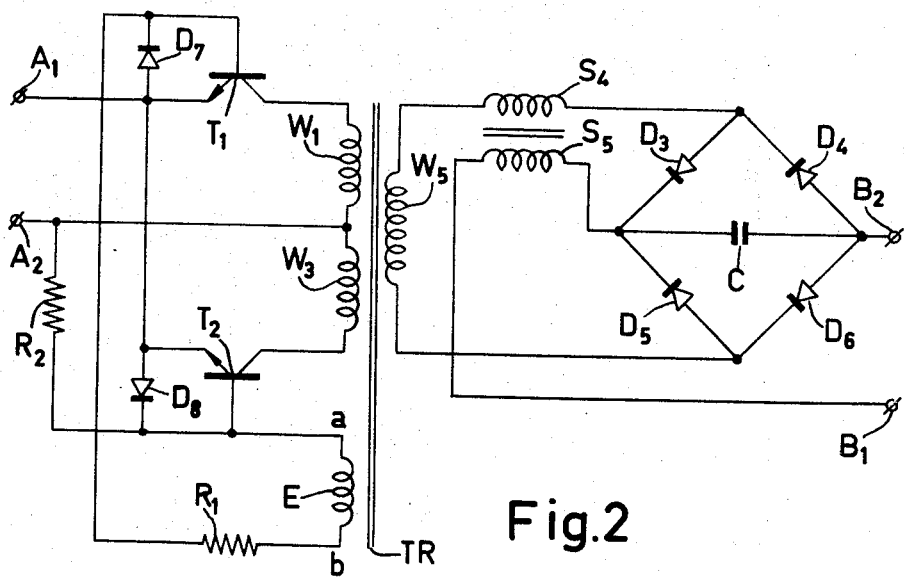
FIG. 2 is a schematic circuit diagram of a second embodiment of the invention.

FIG. 2 shows another embodiment according to the invention. The secondary side of the transformer has only one winding, i.e. winding W5. Also provided are the diodes D3, D4, D5 and D6 and the saturable choke having the first winding S4 (in this case one) and the additional winding S5, the smoothing capacitor C, and the output terminals B1 and B2. The four diodes form a Graetz circuit. The first winding S4 carries positive as well as negative currents. The additional winding S comprises so many turns that its output current saturates the choke, even if the field directions of S4 and S5 are opposed. Consequently, the choke always remains saturated after switching on. Assume that the nominal output current is 10 amperes. The maximum current through S4 is then higher than 10 amperes. Winding S5 must then have a number of turns which is correspondingly larger and, moreover, additional turns for keeping the choke saturated. In practice, S5 will have, for example, twice as many turns as S4.

Various other embodiments according to the invention are possible. For example, the winding S3 in FIG. 1 can be connected to the other terminal of the smoothing capacitor, and the windings S1 and S2 can be connected between the respective diodes and one terminal of the smoothing capacitor.

What is claimed is:

1. A direct-current converter comprising two direct-current input terminals, an oscillator circuit coupled to said input terminals and including amplifier means and a transformer having a primary winding connected thereto and a secondary winding, a rectifier circuit coupled to said secondary winding, a smoothing capacitor coupled to said rectifier circuit, two direct-current load output terminals coupled to the output of the rectifier circuit and to the capacitor, a saturable reactor having first and second winding means, means connecting at least one first winding of the saturable reactor in a conductor between a terminal of the transformer secondary winding and a terminal of the smoothing capacitor, and means connecting a second winding of the saturable reactor between a terminal of the smoothing capacitor and a directcurrent output terminal so that the load current flows through said second winding thereby to saturate the reactor.

2. A direct-current converter as claimed in claim 1 wherein the windings of the saturable reactor are arranged so that the number of turns of said second winding exceeds the number of turns of said one first winding.

3. A direct-current converter as claimed in claim 2 further comprising means connecting a direct-current source to the direct-current input terminals and a load to the direct-current output terminals, and wherein the number of ampere turns of said second winding is so large under the influence of the load current therein that the reactor remains saturated for all desired values of load current.

4. A direct-current converter as claimed in claim 1 wherein said amplifier means includes first and second switching transistors energized from said input terminals and said transformer includes a feedback winding for supplying switching voltages to the control electrodes of the transistors.

5. A direct-current converter as claimed in claim 1 wherein said reactor first winding means includes a third winding connected between a terminal of the transformer secondary winding and said terminal of the capacitor.

6. A direct-current converter as claimed in claim 1 wherein said rectifier circuit comprises a full wave bridge rectifier with the capacitor connected across the bridge output terminals, the first reactor winding connected in series with the transformer secondary winding and the bridge input terminals, and the reactor second winding connected in series with the capacitor across the direct-current output terminals.

7. A DC converter comprising a pair of input terminals adapted to be connected to a source of DC current, an oscillator circuit energized from said input terminals and comprising a pair of switching transistors and a transformer having a primary winding coupled to the transistors, a secondary winding and a feedback winding coupled to the control electrodes of the transistors, a saturable reactor having first and second windings, a filter capacitor, a rectifier circuit, means serially connecting said first winding, said rectifier circuit and said filter capacitor across the transformer secondary winding whereby said capacitor is effectively isolated from the oscillator circuit by said first winding when DC power is first applied to said input terminals, a pair of DC output terminals for connection to a load, and means connecting said reactor second winding in series with the output terminals and the capacitor so that the DC load current flows in said second winding to saturate the reactor and effectively minimize the inductive impedance presented by said first winding.

8. A DC converter as claimed in claim 7 wherein the reactor second winding has more turns than the reactor first winding.

9. A DC converter as claimed in claim 8 further comprising a third winding on the reactor serially connected with the rectifier circuit and the filter capacitor across the transformer secondary winding, said reactor second winding having more turns than the third winding.

* * * * *